(12) United States Patent
Inubushi

(10) Patent No.: US 8,950,798 B2
(45) Date of Patent: Feb. 10, 2015

(54) SPOILER FOR VEHICLE

(75) Inventor: Hiroyuki Inubushi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 201 days.

(21) Appl. No.: 13/823,094

(22) PCT Filed: Aug. 30, 2011

(86) PCT No.: PCT/JP2011/069552
§ 371 (c)(1),
(2), (4) Date: Apr. 30, 2013

(87) PCT Pub. No.: WO2012/039242
PCT Pub. Date: Mar. 29, 2012

(65) Prior Publication Data
US 2013/0223091 A1     Aug. 29, 2013

(30) Foreign Application Priority Data
Sep. 24, 2010   (JP) .................................. 2010-213628

(51) Int. Cl.
*B62D 35/00*   (2006.01)
*B60Q 1/44*    (2006.01)

(52) U.S. Cl.
CPC .............. *B62D 35/007* (2013.01); *B60Q 1/44* (2013.01)
USPC .......................... 296/180.1; 362/487; 362/541

(58) Field of Classification Search
USPC ............ 296/180.1, 180.2; 362/549, 459, 487, 362/541
See application file for complete search history.

(56) References Cited

U.S. PATENT DOCUMENTS

| | | | | |
|---|---|---|---|---|
| 6,953,261 B1* | 10/2005 | Jiao et al. | ........ | 362/487 |
| 7,364,330 B2* | 4/2008 | Nahm et al. | ........ | 362/496 |
| 7,589,622 B2* | 9/2009 | Farley | ........ | 340/468 |
| 2006/0203504 A1* | 9/2006 | Mori | ........ | 362/541 |
| 2007/0053198 A1* | 3/2007 | Hooey | ........ | 362/541 |
| 2008/0272616 A1* | 11/2008 | Wolf | ........ | 296/181.5 |
| 2009/0086499 A1* | 4/2009 | Lin | ........ | 362/487 |
| 2009/0160213 A1* | 6/2009 | Paul et al. | ........ | 296/180.1 |

FOREIGN PATENT DOCUMENTS

| | | |
|---|---|---|
| JP | 02-200581 | 8/1990 |
| JP | 03-121945 | 5/1991 |
| JP | 4-79779 U | 7/1992 |
| JP | 6-85182 U | 12/1994 |
| JP | 2008-149777 | 7/2008 |
| JP | 2010-149754 | 7/2010 |

\* cited by examiner

Primary Examiner — Lori L Lyjak
(74) Attorney, Agent, or Firm — Rankin, Hill & Clark LLP

(57) ABSTRACT

A vehicle spoiler that is provided to the rear part of the vehicle body and extends in the width direction of the vehicle. The spoiler is provided with a resin external surface member; and a metallic reinforcement member for reinforcing the external surface member. The reinforcement member is provided with a reinforcement body extending rearward with respect to the vehicle body from the rear part thereof. The external surface member has an upper member that extends in the width direction of the vehicle above the reinforcement body, and also has a lower member that extends in the width direction of the vehicle below the reinforcement body. The reinforcement body is inserted through the inside of the hollow closed cross-section formed by the upper member and the lower member. The upper member and the lower member are joined within the hollow closed cross-section to the reinforcement body.

20 Claims, 15 Drawing Sheets

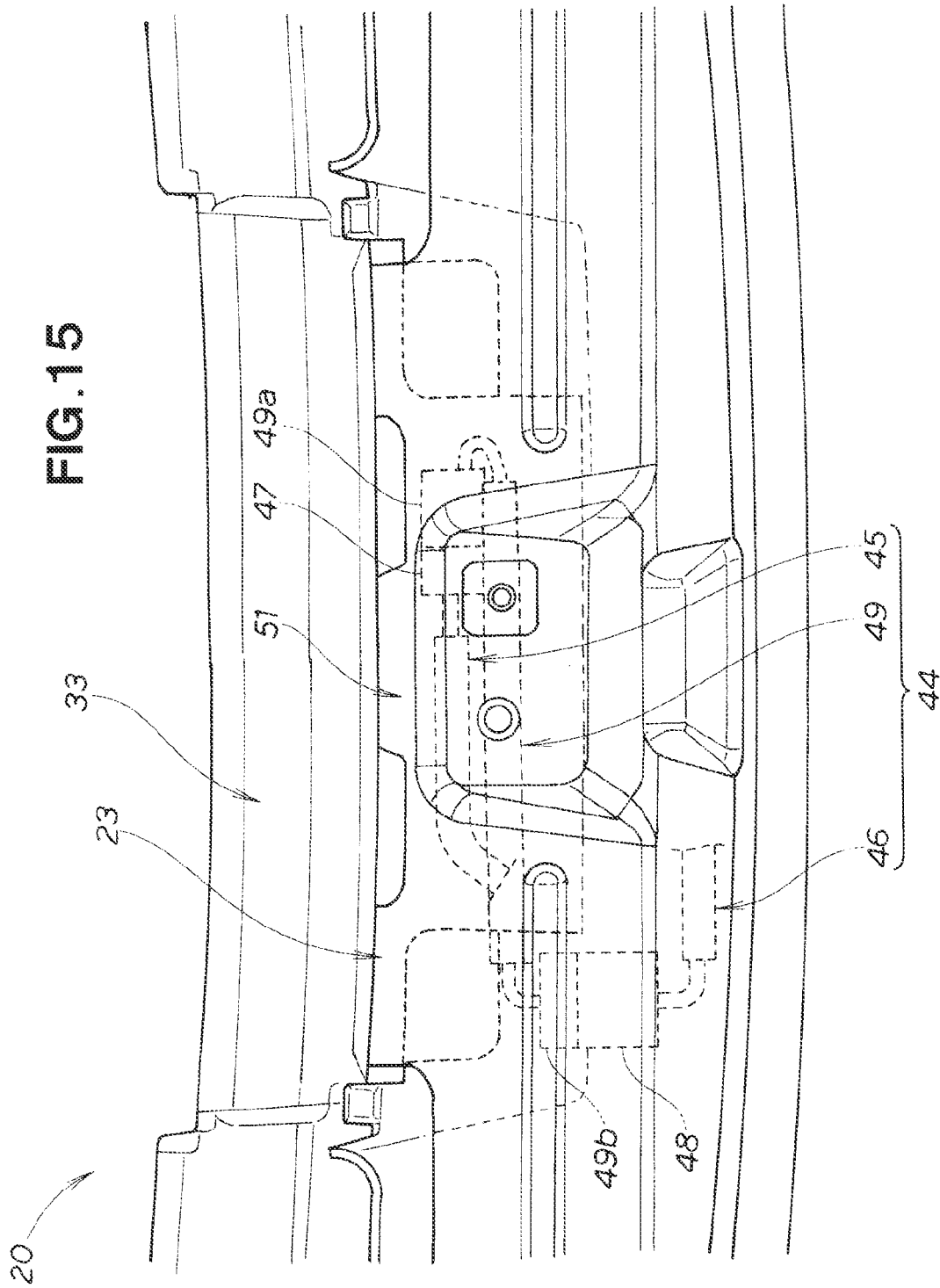

SPOILER FOR VEHICLE

TECHNICAL FIELD

The represent invention relates to a spoiler provided on a rear part of a vehicular body and including a resinous outer cover and a metal core member covered by the outer cover.

BACKGROUND ART

As is well known from Patent Literature 1 below, a vehicular spoiler includes a core member made from a light foaming material and having a similar shape to the spoiler. The spoiler also includes a resinous outer layer disposed around the core member, and a metal reinforcement member disposed between the core member and the resinous outer layer. The reinforcement member reinforces the core member and the resinous outer layer. The spoiler is formed by insert-molding. That is, the reinforcement member adheres to the core member by an adhesive agent, after which the core member with the reinforcement member adhering thereto is placed in a mold. With the core member and the reinforcement member in the mold, then, a urethane resin material is injected under low pressure into the mold to form the resinous outer layer, thereby providing the insert molded spoiler.

The spoiler has a light weight due to the core member of the light forming material.

The spoiler as taught in Patent Literature 1 is formed by inserting the core member and the reinforcement member into the mold and molding the urethane resin material into the resinous outer layer. The reinforcement member to be inserted into the mold along with the core member so as to form the spoiler has its shape determined by a shape of the spoiler, taking account of a direction of removal of the spoiler from the mold.

Further, the reinforcement member may not have a complex uneven shape which makes it difficult for the reinforcement member to closely contact the resinous outer layer. This means that it is difficult for the reinforcement member to have increased rigidity. Furthermore, the reinforcement member entirely closely contacts the resinous outer layer so that the resinous outer layer retains the reinforcement member to fix the reinforcement member within the spoiler. This means that it is not possible to hollow the spoiler so as to reduce a weight of the spoiler.

PRIOR ART LITERATURE

Patent Literature

Patent Literature 1; JP-U-64-2870

SUMMARY OF INVENTION

Technical Problem

An object of the present invention is to provide a vehicular spoiler accommodating a variety of designs and having a reduced weight.

Solution to Problem

According to one aspect of the present invention, there is provided a vehicular spoiler adapted to be disposed on a rear part of a vehicular body and extend laterally of the vehicular body, the spoiler comprising: a resinous outer cover providing an outer appearance of the spoiler; and a metal reinforcement member for reinforcing the outer cover, wherein the reinforcement member includes a reinforcement body extending rearward from the rear part of the vehicular body, wherein the outer cover includes an upper member extending laterally of the vehicular body above the reinforcement body and a lower member extending laterally of the vehicular body below the reinforcement body, wherein the reinforcement body is inserted through a dosed cross-sectional hollow portion defined by the upper member and the lower member, and wherein the upper member and the lower member are coupled to the reinforcement body within the hollow portion.

Preferably, the outer cover has a rear end portion bent to project rearward of the vehicular body as the rear end portion is viewed in side elevation, and the rear end portion includes a rear boundary between the upper member and the lower member, the rear boundary extending along a rear end of the closed cross-sectional hollow portion.

Preferably, a spacing portion is formed between a front end portion of the outer cover and the rear part of the vehicular body and spaces the outer cover from the rear part of the vehicular body, the front end portion of the outer cover having a wedged shape having an acute-angled projection directed forward of the vehicular body as the front end portion is viewed in side elevation, the front end portion including a front boundary between the upper member and the lower member, the front boundary extending along the front end portion.

Preferably, the rear part of the vehicular body defines an opening and includes a closure movable between an open position to open the opening and a closed position to close the opening, and the reinforcement body extends laterally of the vehicular body from one end of the closure to an opposite end of the closure.

Preferably, the reinforcement member includes left and right connection portions extending from the reinforcement body to the closure, the left and right connection portions being coupled to one end of the closure and an opposite end of the closure, and wherein the reinforcement member, the upper member and the lower member are coupled to one another at coupling areas between the left and right connection portions.

Preferably, the coupling areas include a first coupling area where the lower member is coupled directly to the reinforcement body of the reinforcement member, and a second coupling area where the upper member is coupled to the lower member with the reinforcement body interposed between the upper member and the lower member.

Preferably, the reinforcement member and the lower member define a positioning area where the lower member is positioned with respect to the reinforcement member.

Preferably, the outer cover has a rear end portion carrying a brake light on a lateral center thereof and wherein the reinforcement member has a central connecting portion located laterally centrally thereof, the central connecting portion extending from the reinforcement body toward the rear part of the vehicular body, the central connecting portion including a harness fixing part fixed to a harness assembly extending from the rear part of the vehicular body to the brake light.

Preferably, the harness assembly includes a vehicular body harness extending from the rear part of the vehicular body, a brake light harness extending from the brake light, and a connecting harness interconnecting the vehicular body harness and the brake light harness, the vehicular body harness carrying a vehicular body connector connected to the connecting harness, the brake light harness carrying a brake light connector connected to the connecting harness.

Preferably, the central connecting portion has a fastening wall fastened to the rear part of the vehicular body, the harness fixing part extending from the fastening wall, the connecting harness being fixed to the harness fixing part.

Advantageous Effects of Invention

The spoiler is provided on the rear part of the vehicular body and extends laterally of the vehicular body. The spoiler includes the resinous outer cover providing the outer appearance of the spoiler, and the metal reinforcement member for reinforcing the outer cover. The reinforcement member includes the reinforcement body extending rearward from the rear part of the vehicular body. The outer cover includes the upper member extending laterally of the vehicular body above the reinforcement body and the lower member extending laterally of the vehicular body below the reinforcement body. The reinforcement body is inserted through the closed cross-sectional hollow portion defined by the upper member and the lower member, and the upper member and the lower member are coupled to the reinforcement body within the hollow portion.

Since the outer cover providing the outer appearance of the spoiler is formed from the upper and lower members and the upper and lower members are coupled to the reinforcement member within the closed cross-sectional hollow portion, the reinforcement member has its shape not determined by a shape of the outer cover, unlike a reinforcement member insert-molded into the outer cover. This increases a freedom to design the reinforcement member. For example, the reinforcement member may be designed to have an uneven shape without lessening moldability of the upper and lower members. This also increases a freedom to design the upper and lower members.

The closed cross-sectional hollow portion defined by the upper and lower members reduces a weight of the spoiler (air spoiler), unlike in the case of the upper and lower members coupled together to provide a solid outer cover. The spoiler, which extends rearward from the rear part of the vehicular body, may vertically deform, but the vertical deformation of the spoiler can be restricted or limited because the metal reinforcement member includes the reinforcement body extending rearward from the rear part of the vehicular body.

The upper member and the lower member are arranged vertically with the reinforcement body located therebetween. This arrangement facilitates attachment of each of the upper and lower members to the reinforcement body. The front boundary between the upper and lower members faces the rear part of the vehicular body, so that the spoiler may be less disfigured by the front boundary.

The rear end portion of the outer cover is bent to project rearward of the vehicular body as the rear end portion is viewed in side elevation, and the rear boundary between the upper member and the lower member runs along the rear end portion of the outer cover. The rear boundary may provide an aesthetic line to improve the outer appearance of the spoiler.

The spacing portion formed between the front end portion of the outer cover and the rear part of the vehicular body spaces the outer cover from the rear part of the vehicular body to allow air to flow into the spacing portion so as to improve aerodynamic performance of the vehicular body. The front end portion of the outer cover has the wedged shape having the acute-angled projection directed forward of the vehicular body as the front end portion is viewed in side elevation, and the front boundary between the upper member and the lower member runs along the front end portion. The acute-angled projection is difficult to form if the front end portion were a single-piece molded member. This is because the single-piece molded front end portion inevitably has a curvature resulting from a molding process. That wedge shape having the acute-angled projection directed forward of the vehicular body is formed by the upper and lower members, and improves aerodynamic performance of the spoiler.

The rear part of the vehicular body defines the opening and includes the closure movable between the open position to open the opening and the closed position to close the opening, and the reinforcement body extends laterally of the vehicular body from the one end of the closure to the opposite end of the closure. The reinforcement body extending laterally of the vehicular body restricts deformation of the spoiler even if a load is applied to any point of a width of the spoiler during movement of the closure between the open position and the closed position.

The reinforcement member includes the left and right connection portions extending from the reinforcement body to the closure and coupled to the one end and the opposite end of the closure. By the left and right connection portions, the reinforcement bod is supported at opposite ends thereof. The left and right connection portions have high rigidity to support the reinforcement body. In addition, the reinforcement member, the upper member and the lower member are coupled to one another at coupling areas between the left and right connection portions. The coupling areas maintain rigidity between the left and right connection portions.

The coupling areas include the first coupling area where the lower member is coupled directly to the reinforcement body of the reinforcement member, and the second coupling area where the upper member is coupled to the lower member with the reinforcement body interposed between the upper member and the lower member. The lower member is attached to the reinforcement body to form the first coupling area, after which the upper member is attached to the lower member via the reinforcement member to form the second coupling area. This order of attachment of the upper member 32 and the lower member improves efficiency of assemblage of the spoiler. The coupling areas, which includes the first coupling area where the lower member is coupled directly to the reinforcement body and the second coupling area where the upper member is coupled to the lower member with the reinforcement body interposed therebetween, enables the upper member, the lower member and the reinforcement body to be attached together with increased rigidity.

The reinforcement member and the lower member define the positioning area where the lower member is positioned with respect to the reinforcement member. The positioning area enables accurate attachment of the lower member to the reinforcement member.

The rear end portion of the outer cover carries the brake light on a lateral center thereof, and the reinforcement member has the central connecting portion located laterally centrally thereof and extending from the reinforcement body toward the rear part of the vehicular body. The central connecting portion includes the harness fixing part fixed to the harness assembly extending from the rear part of the vehicular body to the brake light. By the harness fixing part, the harness assembly is rigidly attached to the central connecting portion. Since there is no need for another bracket to attach the harness assembly to the central connecting portion, the number of parts of the spoiler can be reduced.

The harness assembly includes the vehicular body harness extending from the rear part of the vehicular body, the brake light harness extending from the brake light, and the connecting harness interconnecting the vehicular body harness and the brake light harness, and the vehicular body harness carries the vehicular body connector connected to the connecting harness while the brake light harness carries the brake light connector connected to the connecting harness. Assemblage of the brake light to the spoiler can be accomplished merely by coupling the connecting harness to the vehicular body harness. This improves efficiency of assemblage of the spoiler. Provision of the brake light connector to the brake light harness eliminates necessity of removing the spoiler during replacement of the brake light. This improves efficiency of replacement of the brake light.

The central connecting portion has the fastening wall fastened to the rear part of the vehicular body, and the harness fixing part extends from the fastening wall and is fixed to the connecting harness. This is advantageous because the harness assembly is coupled to a high rigid location provided by the harness fixing part. In other words, the attachment of the harness assembly is highly rigid.

BRIEF DESCRIPTION OF DRAWINGS

FIG. 15 is a plan view of the harness of the spoiler shown in FIG. 3.

DESCRIPTION OF EMBODIMENT

Embodiment

Figure 1:
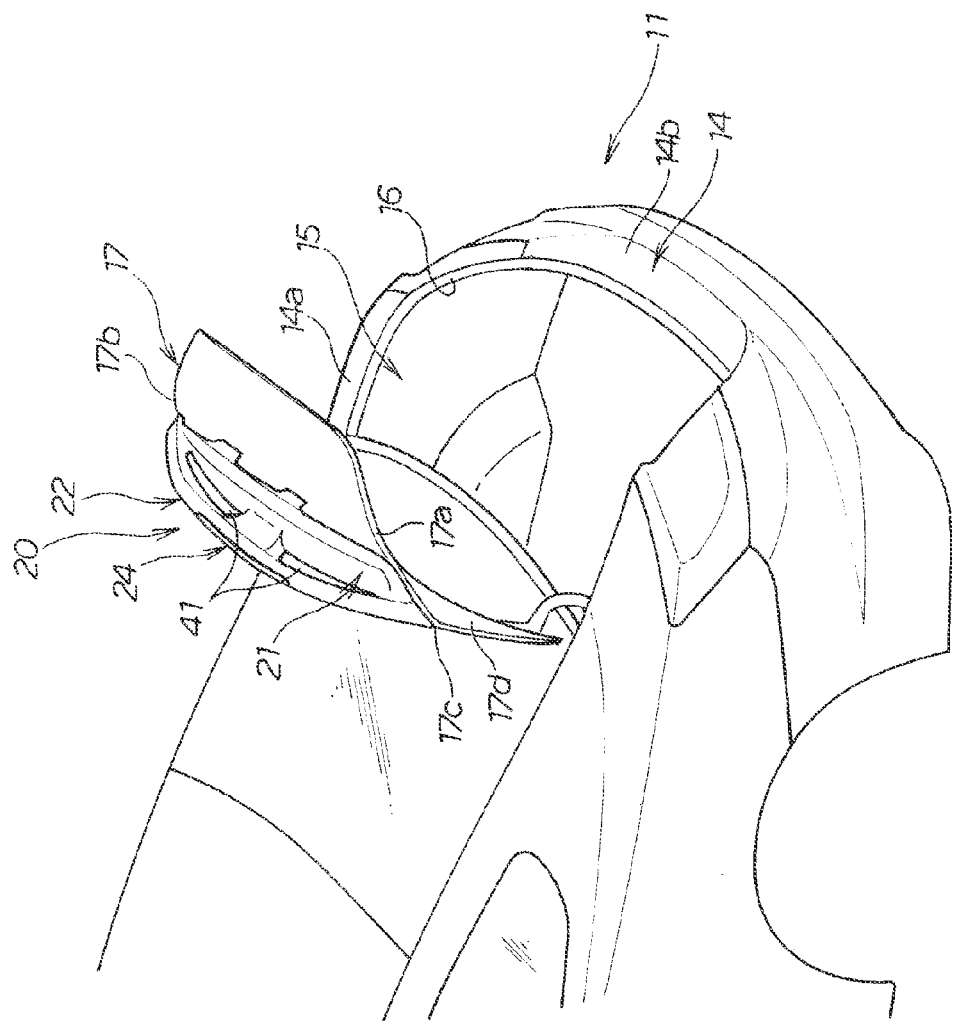
FIG. 1 is a perspective view of a vehicle carrying a spoiler according to the present invention.
Figure 2:
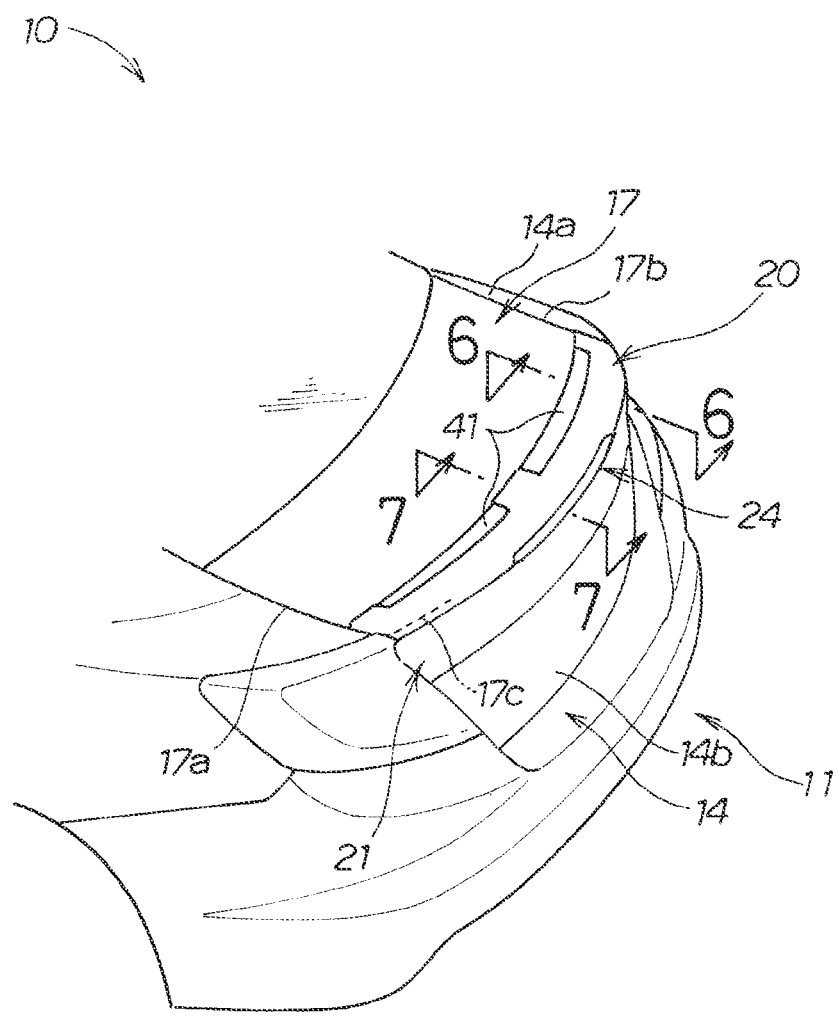
FIG. 2 is a perspective view of the vehicle with a closure closed.
Figure 3:
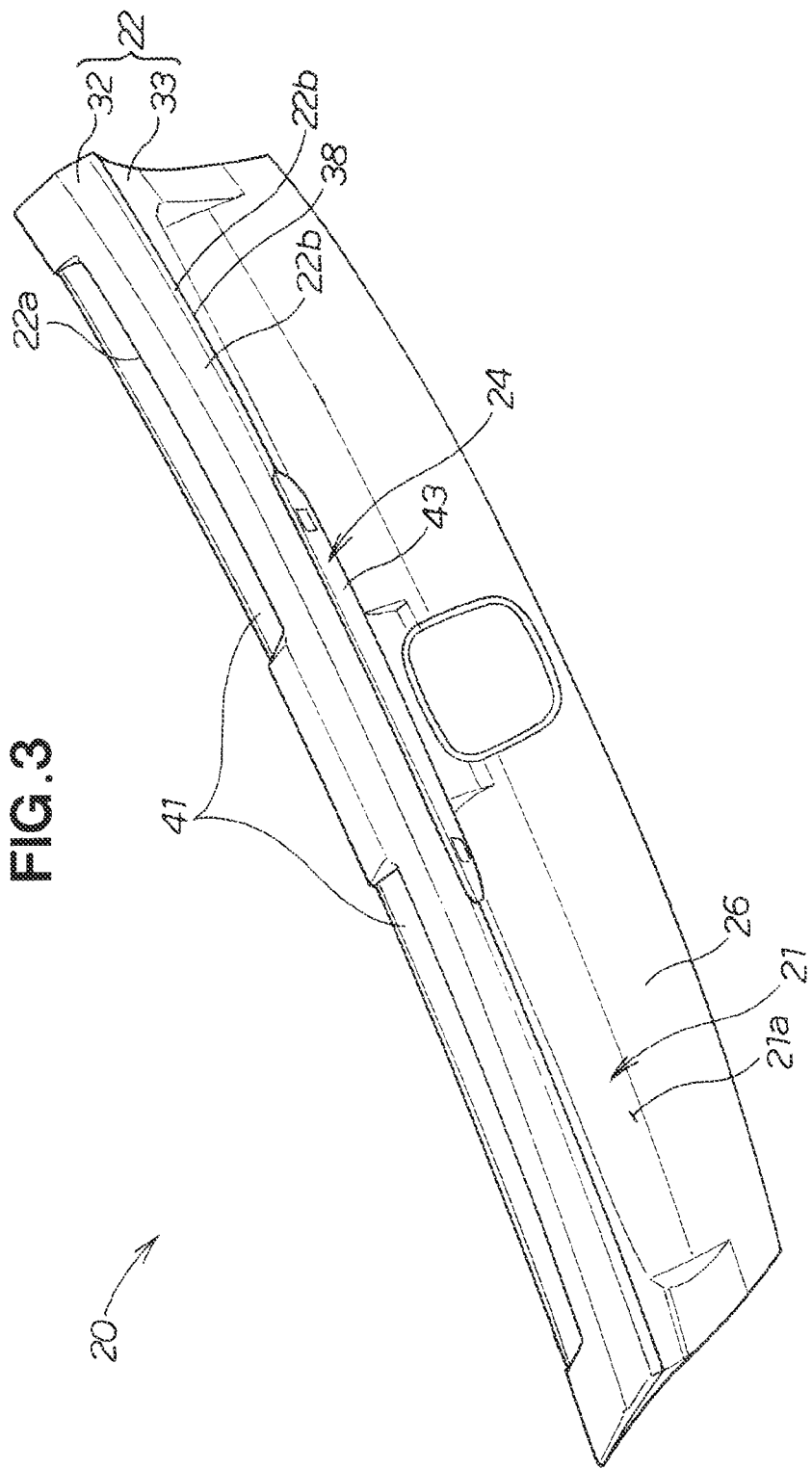
FIG. 3 is a perspective view of the spoiler shown in FIG. 1.

As shown in FIGS. 1 and 2, a vehicle 10 includes a trunk 15 at a rear part 14 of a vehicular body 11 thereof for accommodating articles. The trunk 15 has an opening 16 bounded by a top surface 14a and a rear surface 14b of the rear part 14. The trunk 15 is provided with a closure (trunk lid) 17 for opening and closing the opening 16.

The closure 17 carries a spoiler 20 at a rear top portion 17c thereof, and the spoiler 20 extends from one end (a laterally left end) 17a of the closure 17 to an opposite end (a laterally right end) 17b of the closure 17 for improving airflow over the rear part 14 of the vehicular body 11. In short, the spoiler 20 is disposed on the rear part 14 of the vehicular body 11 and extends laterally of the vehicular body 11. More specifically, the spoiler 20 is attached via a garnish 21 to the closure 17.

As shown in FIGS. 3 to 7, the spoiler 20 includes a resinous outer cover 22 providing an outer appearance of the spoiler 20. The spoiler 20 also includes a metal reinforcement member 23 for reinforcing the outer cover 22. The spoiler 20 further includes a brake light 24 located laterally centrally of the vehicular body 11.

The garnish 21 includes a garnish body 26 made of resin. Welded to a back side 26a of the garnish body 26 are plural clip retainers 27. The clip retainers 27 are provided with plural clips 28. The clips 28 fit through holes 29 formed through the closure 17.

The reinforcement member 23 includes a reinforcement body 31 extending rearward from the rear part 14 of the vehicular body 11. The outer cover 22 includes an upper member 32 extending laterally of the vehicular body 11 above the reinforcement body 31. The outer cover 22 also includes a lower member 33 extending laterally of the vehicular body 11 below the reinforcement body 31.

The upper and lower members 32, 33 jointly define a closed cross-sectional hollow portion 34 through which is inserted the reinforcement body 31. The upper member 32 and the lower member 33 are coupled to the reinforcement body 31 within the closed cross-sectional hollow portion 34.

The outer cover 22 includes a rear end portion 22b bent to project rearward of the vehicular body 11, as the rear end portion 22b is viewed in side elevation. The outer cover 22 includes a front end portion 22a having an acute-angled wedged shape directed forwardly of the vehicular body 11, as the front end portion 22a is viewed in side elevation.

A rear boundary 38 between the upper member 32 and the lower member 33 extends along the rear end portion 22b of the outer cover 22. A front boundary 37 between the upper member 32 and the lower member 33 extends along the front end portion 22a of the outer cover 22. More specifically, the front boundary 37 is located at a bottom of the outer cover 22.

Formed between the front end portion 22a of the outer cover 22 and the rear part 14 of the vehicular body 11 are spacing portions 41 spacing the outer cover 22 from the rear part 14 of the vehicular body 11. More specifically, the spacing portions 41 are formed between the front end portion 22a of the outer cover 22 and a front side 21a of the garnish 21 disposed at a rear end of the closure 17. The spacing portions 41 are left and right ones separate from each other.

Referring to FIGS. 7 and 13 to 15, the brake light 24 includes an exposed brake light body 43 located laterally centrally of the rear end portion 22b of the outer cover 22. The brake light body 43 is provided with a harness assembly 44. The harness assembly 44 includes a vehicular body harness 45 extending from the rear part 14 of the vehicular body 11 (FIG. 11), a brake light harness 46 extending from the brake light body 43, and a connecting harness 49 interconnecting the vehicular body harness 45 and the brake light harness 46.

The vehicular body harness 45 has a tip provided with a vehicular body connector 47. The brake light harness 46 has a tip provided with a brake light connector 48. The connecting harness 49 is provided with one connector 49a connected to the vehicular body connector 47 and an opposite connector 49b connected to the brake light connector 48.

Figure 5:
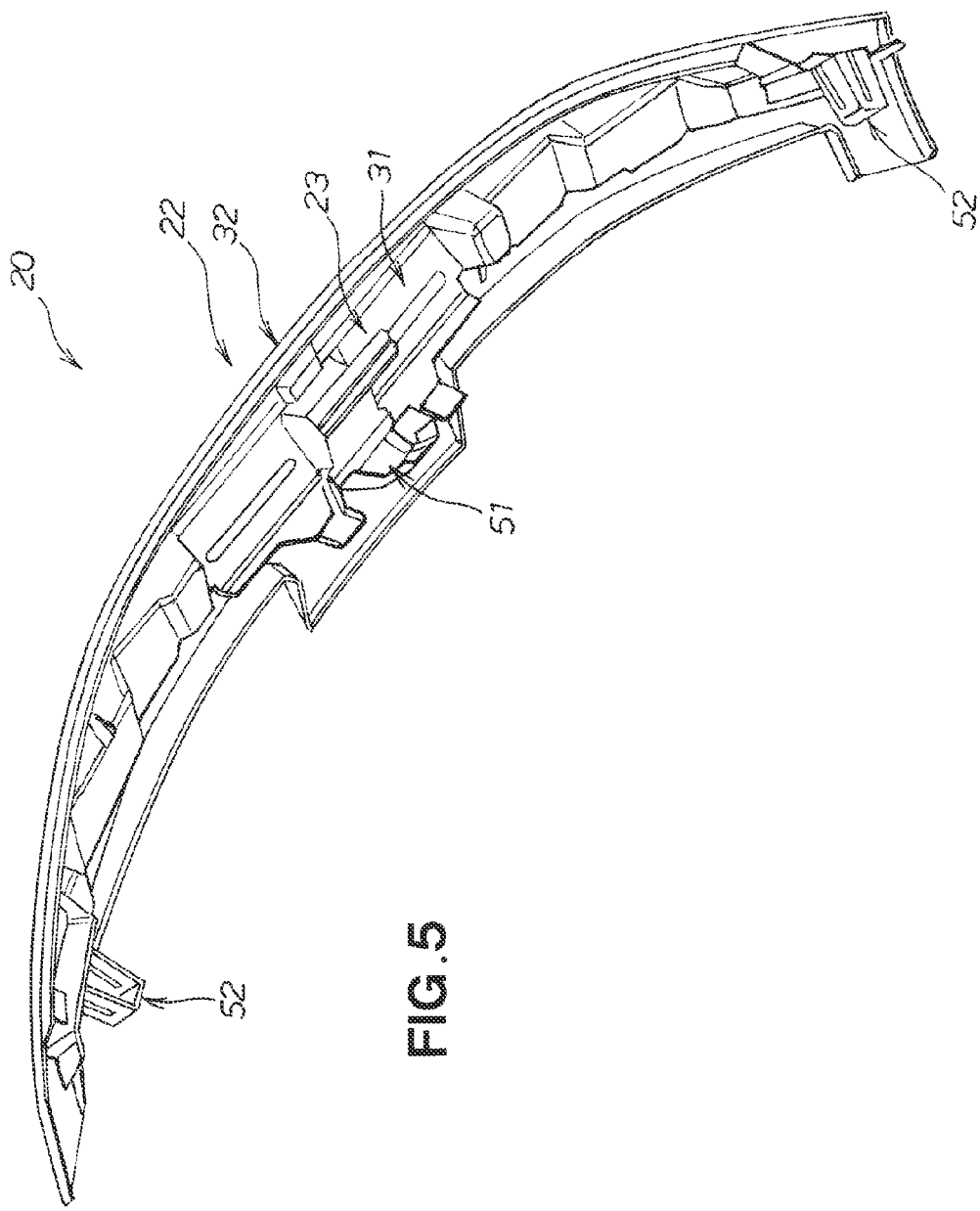
FIG. 5 is a perspective view of the upper member of the spoiler, showing a back side of the upper member.

Next, discussion will be made below as to how the upper member 32, the lower member 33 and the reinforcement member 23 are coupled to one another. As shown in FIGS. 1 and 5, in addition to the reinforcement body 31, the reinforcement member 23 includes a central connecting portion 51 located laterally centrally thereof. The central connecting portion 51 extends from the reinforcement body 31 to the closure 17 (toward the rear part 14 of the vehicular body 11) and is coupled to the closure 17. The reinforcement member 23 also includes left and right connection portions 52, 52 extending from the reinforcement body 31 to the closure 17 and coupled to the one end 17a and the opposite end 17b of the closure 17. The left and right connection portions 52, 52 have the same shape.

Figure 11:
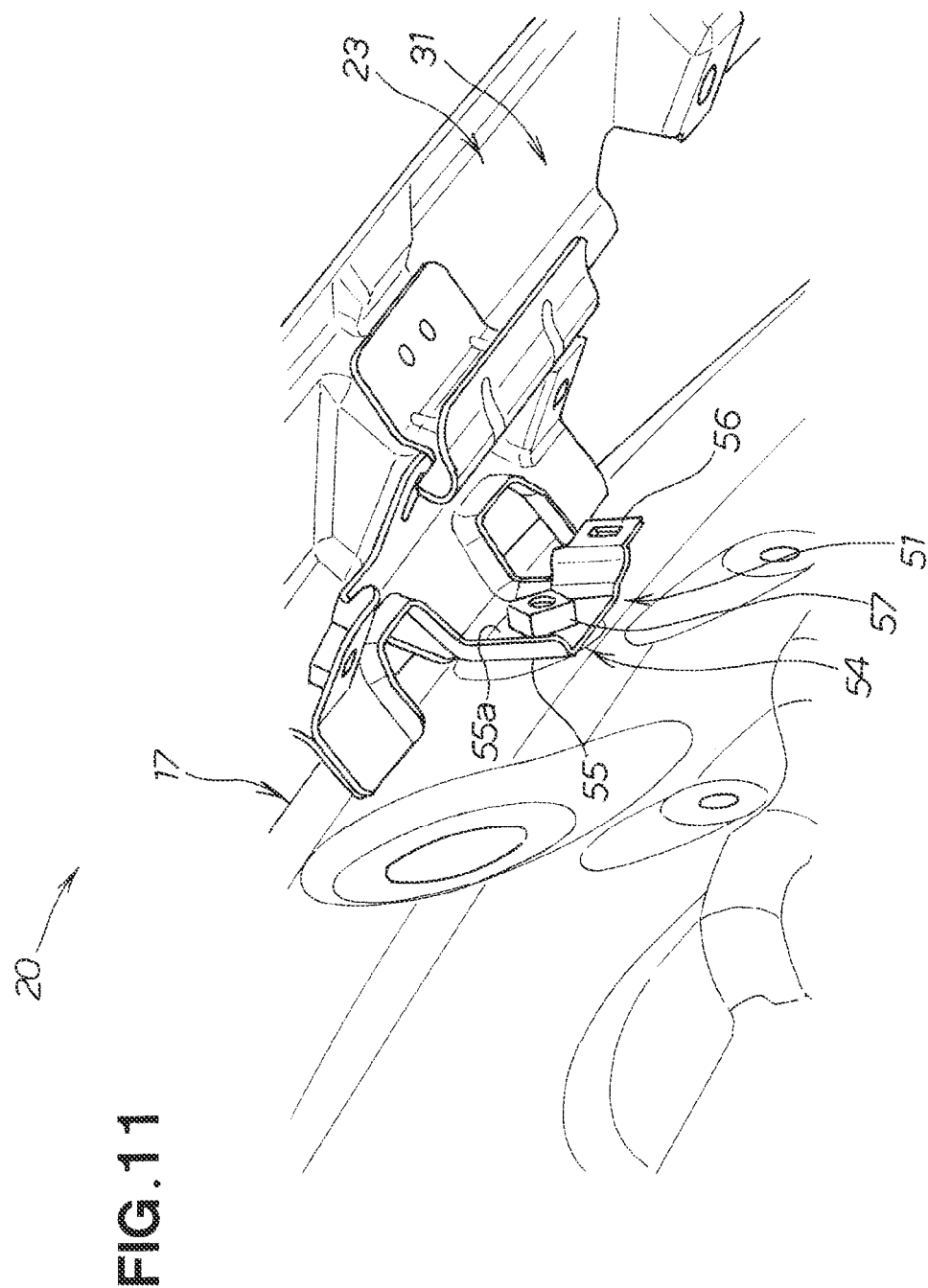
FIG. 11 is a perspective view of a central connecting portion of the spoiler shown in FIG. 3.

As shown in FIG. 11, the central connecting portion 51 includes a generally L-shaped stay 54 welded to the reinforcement body 31. The stay 54 has a fastening wall 55 fastened to the rear part 14 of the vehicular body 11 (the closure 17). From the fastening wall 55, a harness fixing part 56 extends laterally of the vehicular body 11. Fixed to the harness fixing part 56 is the one connector 49a of the connecting harness 49 of the harness assembly 44. The fastening wall 55 has its back side 55a to which is tightened a nut 57 into which a screw (not shown) is screwed from a back side 17d of the closure 17.

Figure 12:
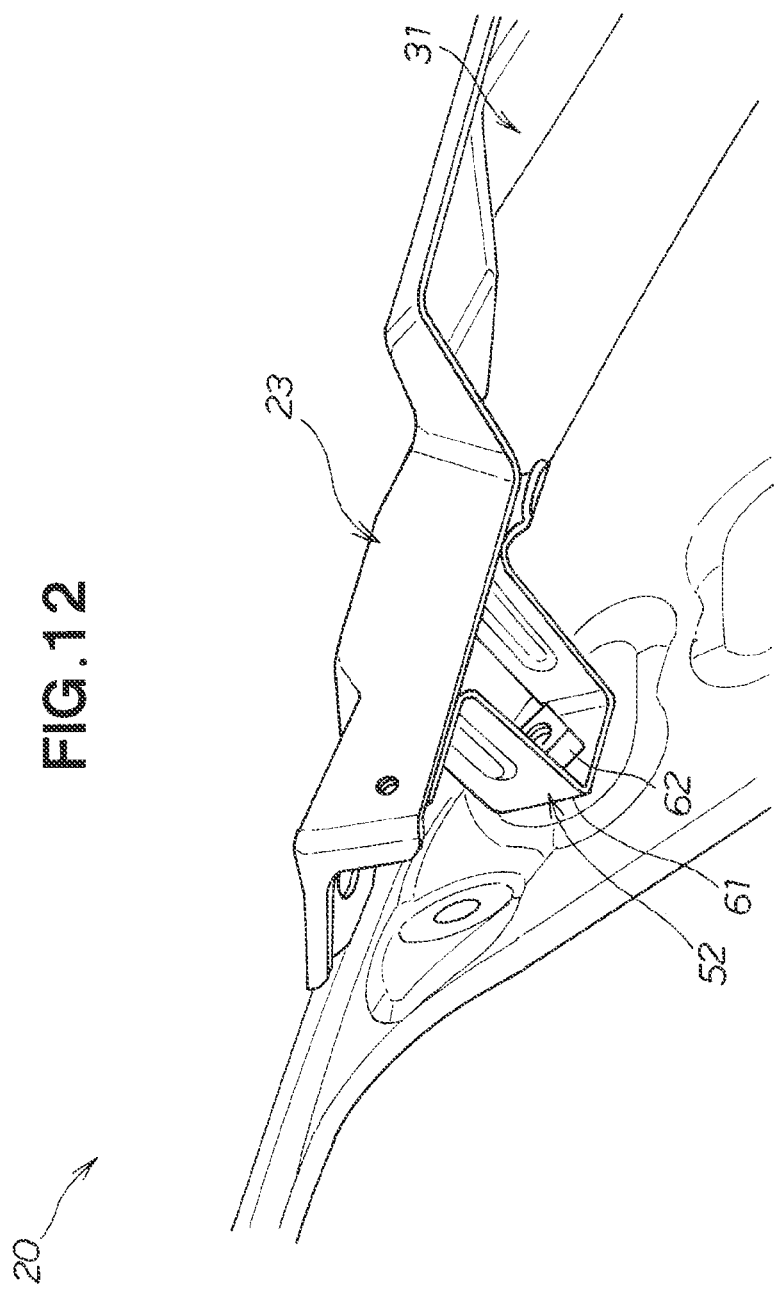
FIG. 12 is a perspective view of a left connection portion of the spoiler shown in FIG. 3.
Figure 13:
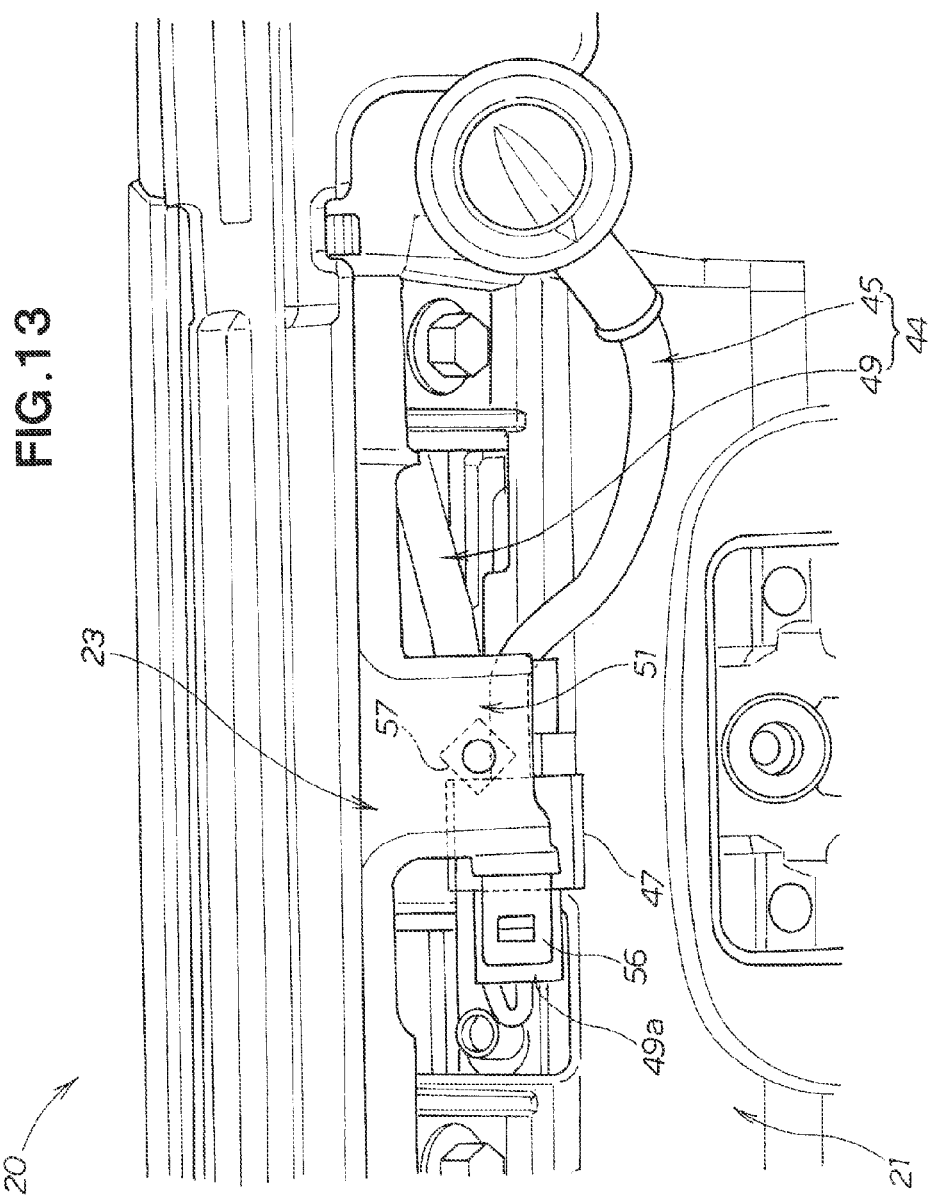
FIG. 13 is a front elevation view of a harness of the spoiler shown in FIG. 3.
Figure 14:
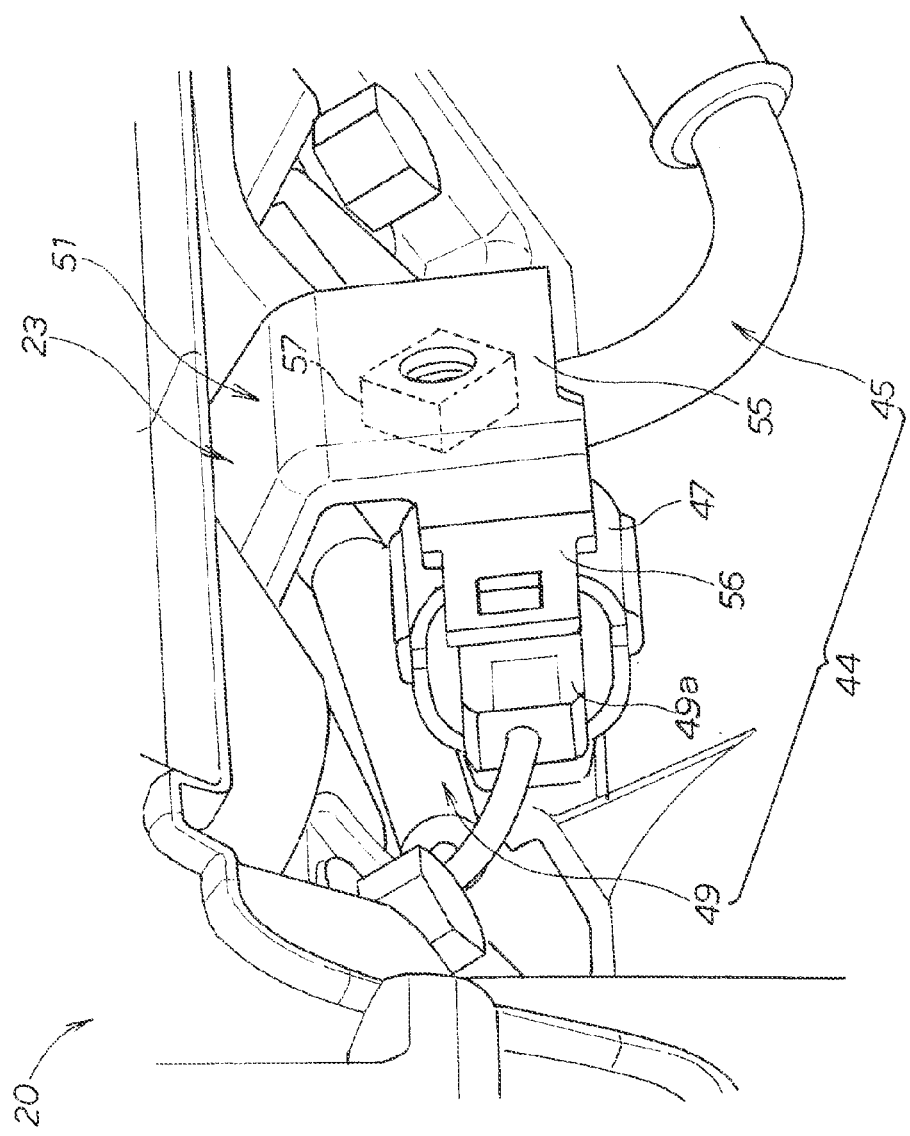
FIG. 14 is a perspective view of the harness of the spoiler shown in FIG. 3.

As shown in FIG. 12, the left (right) connection portion 52 has a connection stay 61 of U-shaped cross-section welded thereto. A nut 62 is tightened to the connection stay 61 to fasten the stay 61 to the closure 17. Into the nut 61, a screw (not shown) is screwed from the back side 17d of the closure 17.

Figure 4:
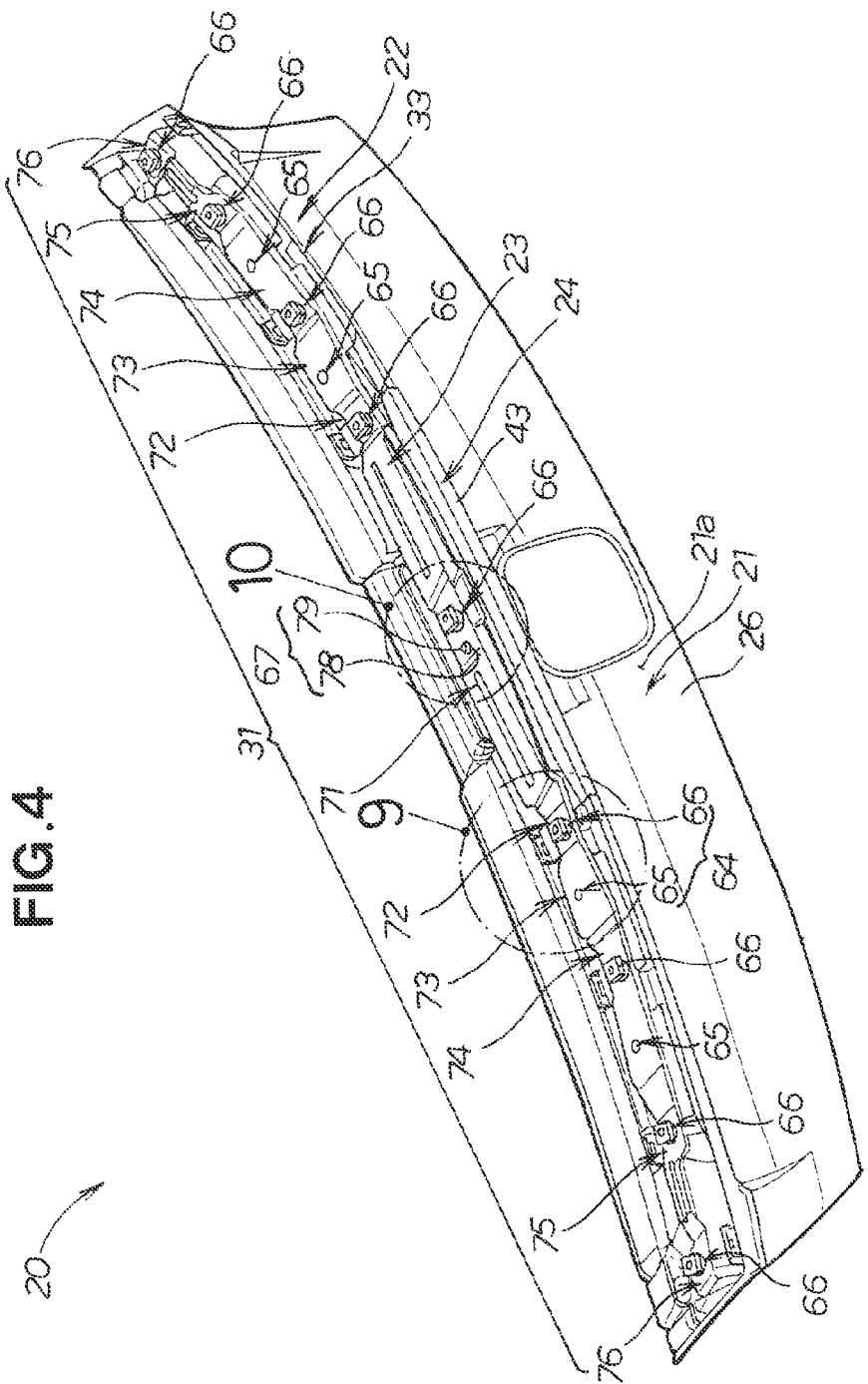
FIG. 4 is a perspective view of the spoiler with an upper member of the spoiler removed.

As shown in FIGS. 4 and 5, the reinforcement member 23, the upper member 32 and the lower member 33 are coupled to one another at coupling areas 64 between the left and right connection portions 52, 52. The coupling areas 64 include a first coupling area 65 where the lower member 33 is coupled directly to the reinforcement body 31 of the reinforcement member 23, and a second coupling area 66 where the upper member 32 is coupled to the lower member 33 with the reinforcement body 31 interposed between the upper member 32 and the lower member 33. It is noted that the coupling areas 64 (first and second coupling areas 65, 66) are omitted in FIG. 5.

The reinforcement member 23 and the lower member 33 define a positioning area 67 where the lower member 33 is positioned with respect to the reinforcement member 23. The reinforcement body 31 of the reinforcement member 23 has its left and right halves arranged in symmetric relationship with each other. More specifically, the reinforcement, body 31 includes a central reinforcement portion 71 located centrally thereof, and first to fifth reinforcement portions 72 to 76 located on each of left and right sides thereof.

The central reinforcement portion 71 provides the positioning area 67 for positioning of the lower member 33 relative to the reinforcement member 23. In addition, the central reinforcement portion 71 provides the second coupling area 66 where the upper member 32 is coupled to the lower member 33 with the reinforcement body 31 being interposed therebetween. The left and right first reinforcement portions 72, 72 each provide the second coupling area 66 only. The left and right second reinforcement portions 73, 73 each provide the first coupling area 65 only. The left and right third reinforcement portions 74, 74 each provide the first and second coupling areas 65, 66. The left and right fourth reinforcement portions 75, 75 each provide the second coupling area 66 only. The left and right fifth reinforcement portions 76, 76 each provide the second coupling area 66 only.

Figure 10:
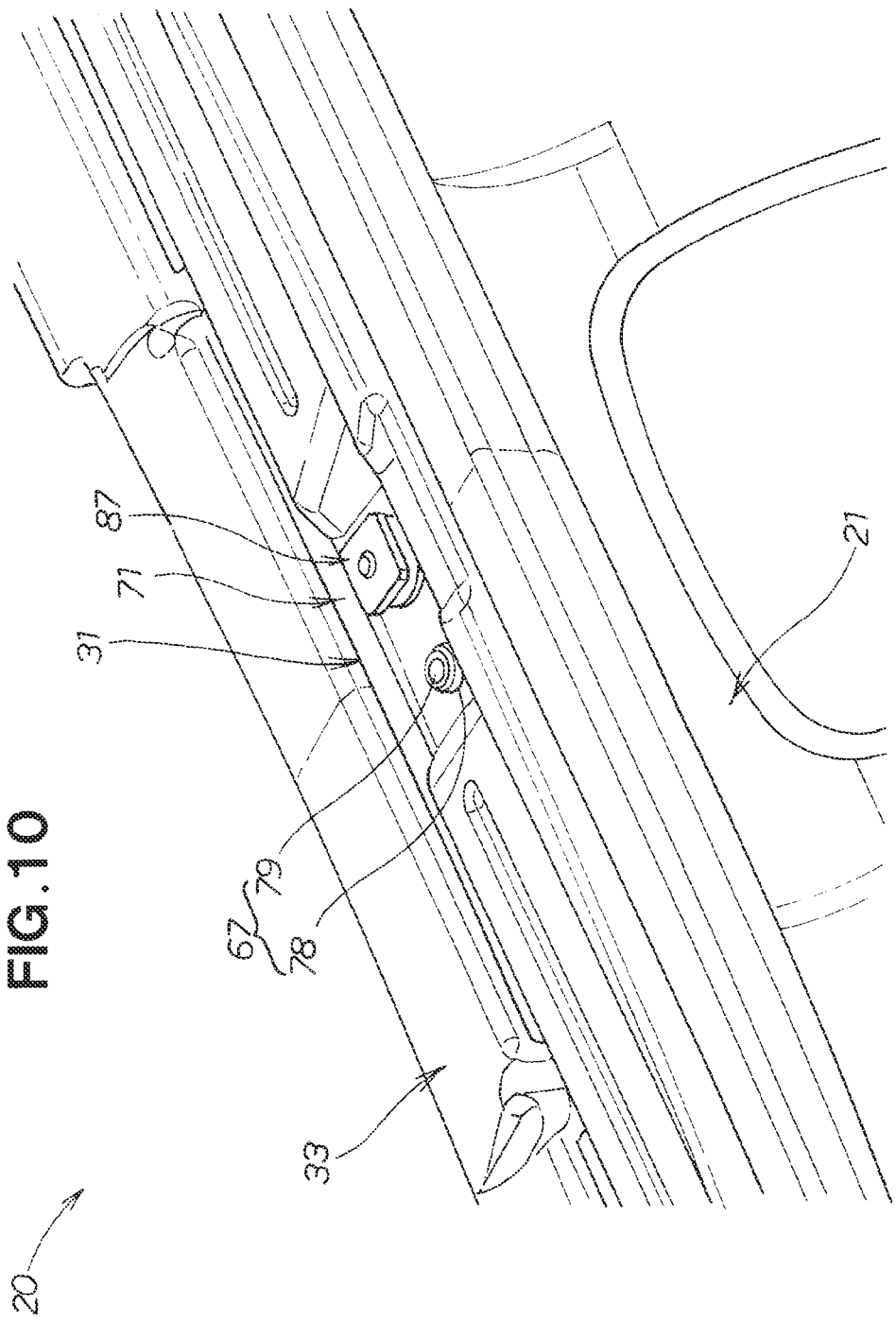
FIG. 10 is an enlarged view of a location encircled at reference numeral 10 of FIG. 4.

As shown in FIG. 10, the positioning area 67 is defined by a positioning boss 79 formed on the lower member 33 and a positioning hole 78 formed through the reinforcement body 31 (more specifically the central reinforcement portion 71) of the reinforcement member 23.

Figure 6:
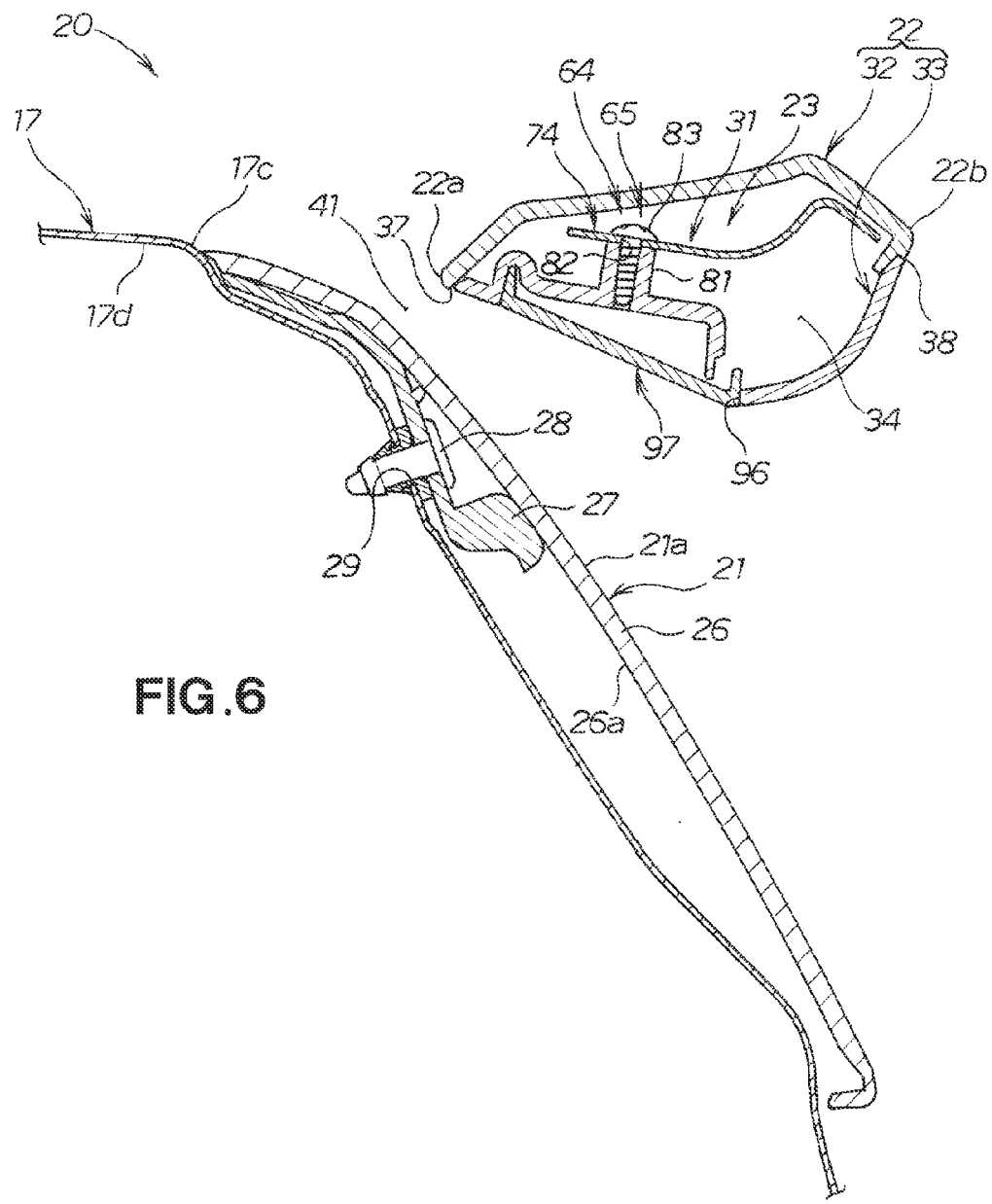
FIG. 6 is a cross-sectional view taken along line 6-6 of FIG. 2.

As shown in FIG. 6, the first coupling area 65 is defined by a boss 81 of the lower member 33, a through-hole 82 formed through the reinforcement body 31, and a screw 83 screwed through the through-hole 82 into the boss 81 to couple the reinforcement body 31 of the reinforcement member 23 to the lower member 33.

Figure 7:
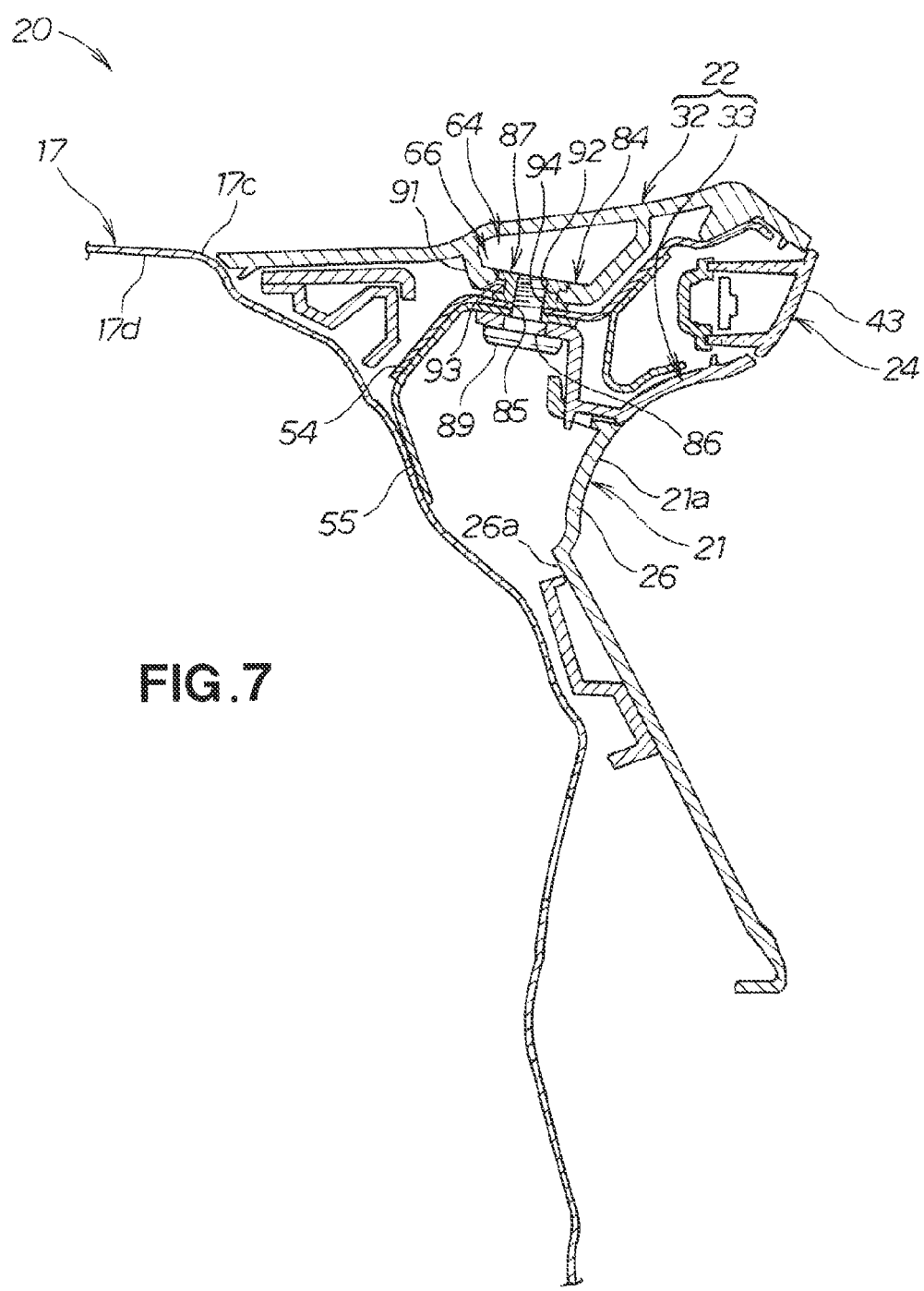
FIG. 7 is a cross-sectional view taken along line 7-7 of FIG. 2.
Figure 8:
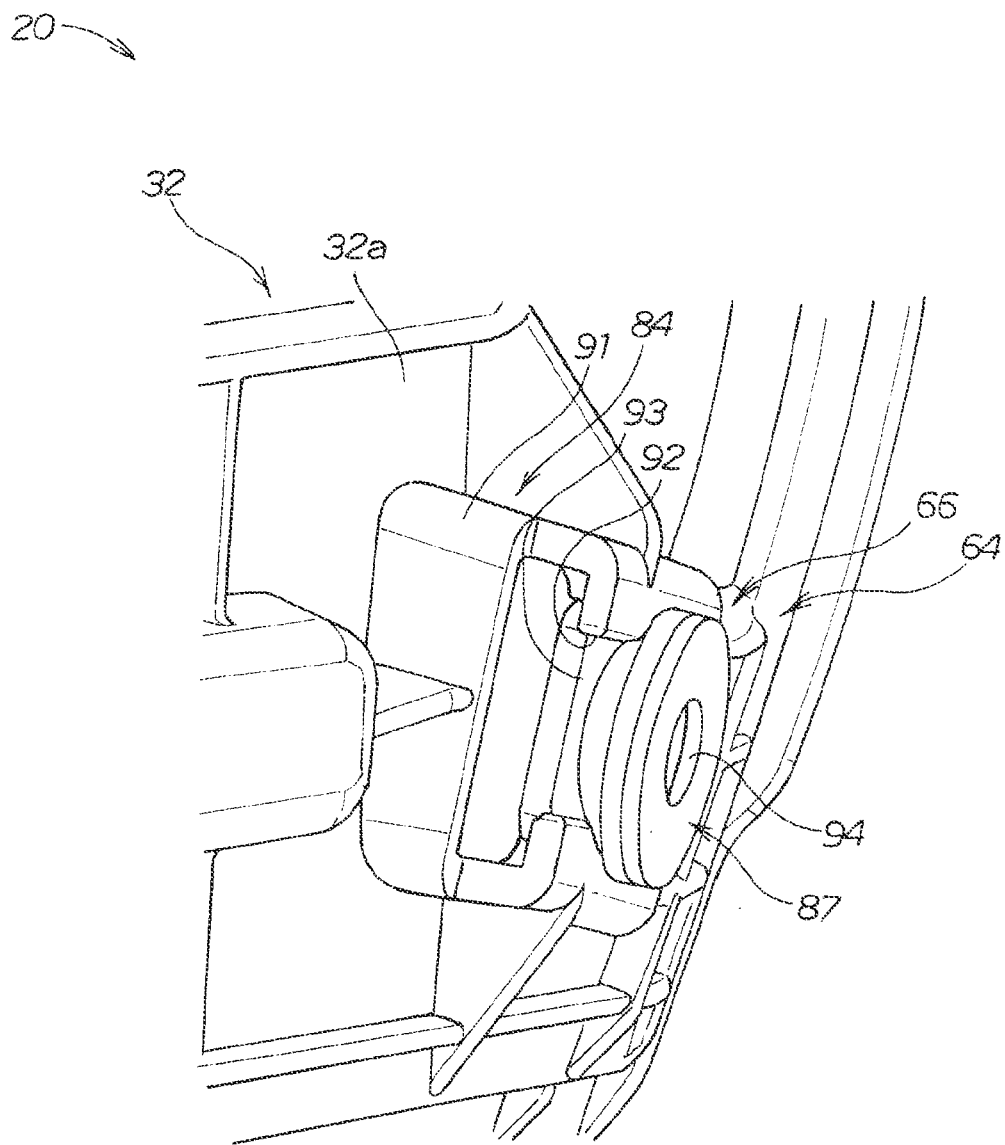
FIG. 8 is a perspective view of a second coupling area of the spoiler shown in FIG. 3.
Figure 9:
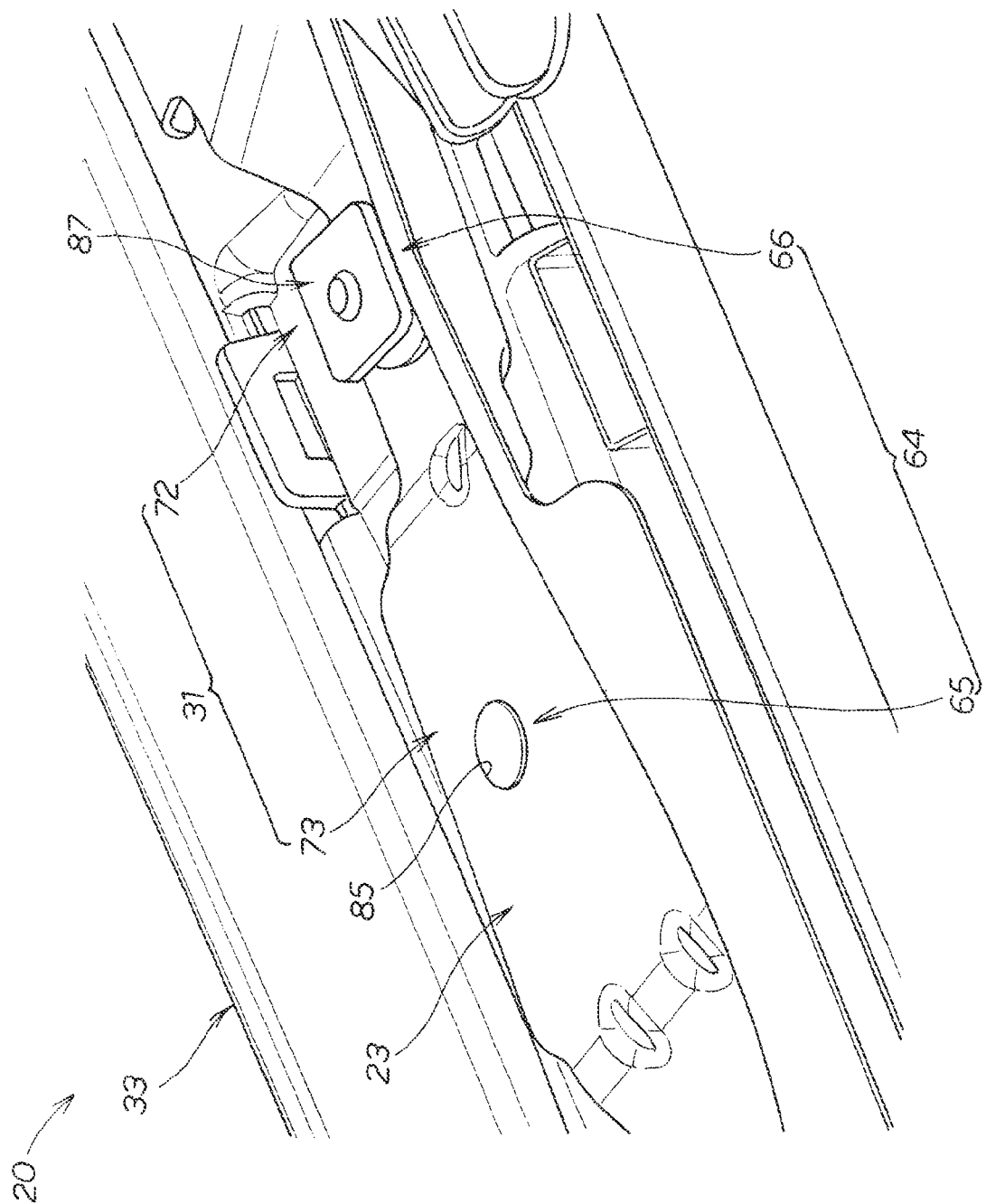
FIG. 9 is an enlarged view of a location encircled at reference numeral 9 of FIG. 4.

As shown in FIGS. 7 to 9, the second coupling area 66 is defined by a nut retaining portion 84 of the upper member 32, a hole 85 formed through the reinforcement body 31 of the reinforcement member 23, a hole 86 formed through the lower member 33, a nut 87 fitting in the nut retaining portion 84, and a screw 89 screwed through the hole 86 and then the hole 85 into the nut 87 after the nut 87, the reinforcement member 23 and the lower member 33 are arranged in this order and stacked on one another. By the screw 89 screwed into the nut 87, the upper member 32, the reinforcement member 23 and the lower member 33 are coupled together.

The nut retaining portion 84 includes a seat 91 defining a bottom wall 32a of the upper member 32. Formed through the seat 91 is a fitting groove (U-groove) 92. The nut 87 is made of metal and includes a fitting portion 93 fitting to the fitting groove 92, and a screw hole 94 through which is screwed the screw 89. Referring to FIG. 6, the lower member 33 has an opening 96 for use in fastening the reinforcement member 23 and the lower member 33 to the upper member 32. A cover member 97 detachably fits within the opening 96.

As shown in FIGS. 2 and 6, the spoiler 20 is provided on the rear part 14 of the vehicular body 11 and extends laterally of the vehicular body 11. The spoiler 20 includes the resinous outer cover 22 providing the outer appearance of the spoiler 20, and the metal reinforcement member 23 for reinforcing the outer cover 22. The reinforcement member 23 includes the reinforcement body 31 extending rearward from the rear part 14 of the vehicular body 11.

The outer cover 22 includes the upper member 32 extending laterally of the vehicular body 11 above the reinforcement body 31 and the lower member 33 extending laterally of the vehicular body 11 below the reinforcement body 31. The reinforcement body 31 is inserted through the closed cross-sectional hollow portion 34 defined by the upper member 32 and the lower member 33, and the upper member 32 and the lower member 33 are coupled to the reinforcement body 31 within the hollow portion 34.

Since the outer cover 22 providing the outer appearance of the spoiler 20 is formed from the upper and lower members 32, 33 and the upper and lower members 32, 33 are coupled to the reinforcement member 23 within the closed cross-sectional hollow portion 34, the reinforcement member 23 has its shape not determined by a shape of the outer cover 22, unlike a reinforcement member insert-molded into the outer cover 22. This increases a freedom to design the reinforcement member 23. For example, the reinforcement member 23 may be designed to have an uneven shape without lessening moldability of the upper and lower members 32, 33. This also increases a freedom to design the upper and lower members 32, 33.

The closed cross-sectional hollow portion 34 defined by the upper and lower members 32, 33 reduces a weight of the spoiler (air spoiler) 20, unlike in the case of the upper and lower members coupled together to provide a solid outer cover.

The spoiler, which extends rearward from the rear part 14 of the vehicular body 11, may vertically deform, but the vertical deformation of the spoiler can be restricted or limited because the metal reinforcement member 23 includes the reinforcement body 31 extending rearward from the rear part 14 of the vehicular body 11.

The upper member 32 and the lower member 33 are arranged vertically with the reinforcement body 31 located therebetween. This arrangement facilitates attachment of each of the upper and lower members 32, 33 to the reinforcement body 31. The front boundary 37 between the upper and lower members 32, 33 faces the rear part of the vehicular body, so that the spoiler may be less disfigured by the front boundary 37.

The rear end portion 22b of the outer cover 22 is bent to project rearward of the vehicular body 11, and the rear boundary 38 between the upper member 32 and the lower member 33 runs along the rear end portion 22b of the outer cover 22. The rear boundary 38 may provide an aesthetic line to improve the outer appearance of the spoiler 20.

The spacing portion 41 formed between the front end portion 22a of the outer cover 22 and the rear part 14 of the vehicular body 11 spaces the outer cover 22 from the rear part 14 of the vehicular body 11 to allow air to flow into the spacing portion so as to improve aerodynamic performance of the vehicular body 11.

The front end portion 22a of the outer cover 22 has the wedged shape having the acute-angled projection directed forward of the vehicular body 11, and the front boundary 37 between the upper member 32 and the lower member 33 runs along the front end portion. The acute-angled projection is difficult to form if the front end portion 22a were a single-piece molded member. This is because the single-piece molded front end portion inevitably has a curvature resulting from a molding process.

That wedge shape having the acute-angled projection directed forward of the vehicular body 11 is formed by the upper and lower members 32, 33, and improves aerodynamic performance of the spoiler 20.

As shown in FIGS. 1 and 4, the rear part 14 of the vehicular body 11 defines the opening 16 and includes the closure 17 movable between an open position to open the opening 16 and a closed position to close the opening 16, and the reinforcement body 31 extends laterally of the vehicular body 11 from the one end 17a of the closure 17 to the opposite end 17b of the closure 17. The reinforcement body 31 extending laterally of the vehicular body 11 restricts deformation of the spoiler 20 even if a load is applied to any point of a width of the spoiler 20 during movement of the closure 17 between the open position and the closed position.

As shown in FIGS. 4 and 5, the reinforcement member 23 includes the left and right connection portions 52, 52 extending from the reinforcement body 31 to the closure 17 and coupled to the one end ra and the opposite end 17b of the closure 17. By the left and right connection portions 52, 52, the reinforcement body 31 is supported at opposite ends thereof. The left and right connection portions 52, 52 have high rigidity to support the reinforcement body 31. In addition, the reinforcement member 23, the upper member 32 and the lower member 33 are coupled to one another at coupling areas 64 between the left and right connection portions 52, 52. The coupling areas 64 maintain rigidity between the left and right connection portions 52, 52.

As shown in FIGS. 6 and 7, the coupling areas 64 include the first coupling area 65 where the lower member 33 is coupled directly to the reinforcement body 31 of the reinforcement member 11, and the second coupling area 66 where the upper member 32 is coupled to the lower member 33 with the reinforcement body 31 interposed between the upper member 32 and the lower member 33. The lower member 33 is attached to the reinforcement body 31 to form the first coupling area 65, after which the upper member 32 is attached to the lower member 33 via the reinforcement member 33 to form the second coupling area 66. This order of attachment of the upper member 32 and the lower member 33 improves efficiency of assemblage of the spoiler 20.

The coupling areas 64, which includes the first coupling area 65 where the lower member 33 is coupled directly to the reinforcement, body 31 and the second coupling area 66 where the upper member 32 is coupled to the lower member 33 with the reinforcement body 31 interposed therebetween, enables the upper member 32, the lower member 33 and the reinforcement body 31 to be attached together with increased rigidity.

As shown in FIG. 10, the reinforcement member 23 and the lower member 33 define the positioning area 67 where the lower member 33 is positioned with respect to the reinforcement member 23. The positioning area 67 enables accurate attachment of the lower member 33 to the reinforcement member 23.

As shown in FIGS. 3 and 11 to 15, the rear end portion 22b of the outer cover 22 carries the brake light 24 on a lateral center thereof, and the reinforcement member 23 has the central connecting portion 51 located laterally centrally thereof and extending from the reinforcement body 31 toward the rear part 14 of the vehicular body 11.

The central connecting portion 51 includes the harness fixing part 56 fixed to the harness assembly 44 extending from the rear part 14 of the vehicular body 11 to the brake light 24. By the harness fixing part 56, the harness assembly 44 is rigidly attached to the central connecting portion 51. Since there is no need for another bracket to attach the harness assembly 44 to the central connecting portion 51, the number of parts of the spoiler can be reduced.

The harness assembly 44 includes the vehicular body harness 45 extending from the rear part 14 of the vehicular body 11, the brake light harness 46 extending from the brake light 24, and the connecting harness 49 interconnecting the vehicular body harness 45 and the brake light harness 46, and the vehicular body harness 45 carries the vehicular body connector 47 connected to the connecting harness 49 while the brake light harness 46 carries the brake light connector 48 connected to the connecting harness 49. Assemblage of the brake light 24 to the spoiler 20 can be accomplished merely by coupling the connecting harness 49 to the vehicular body harness 45. This improves efficiency of assemblage of the spoiler 20.

Provision of the brake light connector 48 to the brake light harness 46 eliminates necessity of removing the spoiler 20 during replacement of the brake light 24. This improves efficiency of replacement of the brake light 24.

The central connecting portion 51 has the fastening wall 55 fastened to the rear part 14 of the vehicular body 11, and the harness fixing part 56 extends from the fastening wall 55 and is fixed to the one connector 49a of the connecting harness 49. This is advantageous because the harness assembly 44 is coupled to a high rigid location provided by the harness fixing part 56. In other words, the attachment of the harness assembly 44 is highly rigid.

It is noted that the closure 17 may be a tailgate or other structure for opening and closing the opening 16 although the closure is show as the trunk lid in FIG. 1.

INDUSTRIAL APPLICABILITY

The spoiler according to the present invention is suitable for use in a car such as a sedan or van.

REFERENCE SIGNS LIST

10 . . . a vehicle, 11 . . . a vehicular body, 14 . . . , a rear part, 14a . . . a top surface, 16 . . . an opening, 14b . . . a rear surface, 17 ... a closure, 17a ... one end, 17b ... an opposite end, 20 ... a spoiler, 22 ... an outer cover, 22a ... a front end portion, 22b ... a rear end portion, 23 ... a reinforcement member, 24 ... a brake light, 31 ... a reinforcement body, 32 ... an upper member, 33 ... a lower member, 34 ... a closed cross-sectional hollow portion, 37 ... a front boundary, 38 ... a rear boundary, 41 ... a spacing portion, 44 ... a harness assembly, 45 ... a vehicular body harness, 46 ... a brake light harness, 47 ... a vehicular body connector, 48 ... a brake light connector, 49 ... a connecting harness, 51 ... a central connecting portion, 52 ... left and right connecting portions, 55 ... a fastening wall, 56 ... a harness fixing part, 64 ... coupling areas, 65 ... a first coupling area, 66 ... a second coupling area, 67 ... a positioning area

The invention claimed is:

1. A vehicular spoiler adapted to be disposed on a rear part of a vehicular body and extend laterally of the vehicular body, the spoiler comprising:
a resinous outer cover providing an outer appearance of the spoiler; and
a metal reinforcement member for reinforcing the outer cover,
wherein the reinforcement member includes a reinforcement body extending rearward from the rear part of the vehicular body,
wherein the outer cover includes an upper member extending laterally of the vehicular body above the reinforcement body and a lower member extending laterally of the vehicular body below the reinforcement body,
wherein the reinforcement body is inserted through a closed cross-sectional hollow portion defined by the upper member and the lower member, and
wherein the upper member and the lower member are coupled to the reinforcement body within the hollow portion.

2. The spoiler of claim 1, wherein the outer cover has a rear end portion bent to project rearward of the vehicular body as the rear end portion is viewed in side elevation, and the rear end portion includes a rear boundary between the upper member and the lower member, the rear boundary extending along a rear end of the closed cross-sectional hollow portion.

3. The spoiler of claim 1, further comprising a spacing portion between a front end portion of the outer cover and the rear part of the vehicular body and spacing the outer cover from the rear part of the vehicular body, the front end portion of the outer cover having a wedged shape having an acute-angled projection directed forward of the vehicular body as the front end portion is viewed in side elevation, the front end portion including a front boundary between the upper member and the lower member, the front boundary extending along the front end portion.

4. The spoiler of claim 1, wherein the rear part of the vehicular body defines an opening and includes a closure movable between an open position to open the opening and a closed position to close the opening, and the reinforcement body extends laterally of the vehicular body from one end (17a) of the closure to an opposite end of the closure.

5. The spoiler of one of claim 1, wherein the reinforcement member includes left and right connection portions extending from the reinforcement body to the closure, the left and right connection portions being coupled to one end of the closure and an opposite end of the closure, and wherein the reinforcement member, the upper member and the lower member are coupled to one another at coupling areas between the left and right connection portions.

6. The spoiler of claim 5, wherein the coupling areas include a first coupling area where the lower member is coupled directly to the reinforcement body of the reinforcement member, and a second coupling area where the upper member is coupled to the lower member with the reinforcement body interposed between the upper member and the lower member.

7. The spoiler of one of claim 1, wherein the reinforcement member and the lower member define a positioning area where the lower member is positioned with respect to the reinforcement member.

8. The spoiler of claim 1, wherein the outer cover has a rear end portion carrying a brake light on a lateral center thereof and wherein the reinforcement member has a central connecting portion located laterally centrally thereof, the central connecting portion extending from the reinforcement body toward the rear part of the vehicular body, the central connecting portion including a harness fixing part fixed to a harness assembly extending from the rear part of the vehicular body to the brake light.

9. The spoiler of claim 8, wherein the harness assembly includes a vehicular body harness extending from the rear part of the vehicular body, a brake light harness extending from the brake light, and a connecting harness interconnecting the vehicular body harness and the brake light harness, the vehicular body harness carrying a vehicular body connector connected to the connecting harness, the brake light harness carrying a brake light connector connected to the connecting harness.

10. The spoiler of claim 9, wherein the central connecting portion has a fastening wall fastened to the rear part of the vehicular body, the harness fixing part extending from the fastening wall, the connecting harness being fixed to the harness fixing part.

11. The spoiler of claim 2, further comprising a spacing portion between a front end portion of the outer cover and the rear part of the vehicular body and spacing the outer cover from the rear part of the vehicular body, the front end portion of the outer cover having a wedged shape having an acute-angled projection directed forward of the vehicular body as the front end portion is viewed in side elevation, the front end portion including a front boundary between the upper member and the lower member, the front boundary extending along the front end portion.

12. The spoiler of claim 2, wherein the rear part of the vehicular body defines an opening and includes a closure movable between an open position to open the opening and a closed position to close the opening, and the reinforcement body extends laterally of the vehicular body from one end (17a) of the closure to an opposite end of the closure.

13. The spoiler of claim 3, wherein the rear part of the vehicular body defines an opening and includes a closure movable between an open position to open the opening and a closed position to close the opening, and the reinforcement body extends laterally of the vehicular body from one end (17a) of the closure to an opposite end of the closure.

14. The spoiler of claim 2, wherein the reinforcement member includes left and right connection portions extending from the reinforcement body to the closure, the left and right connection portions being coupled to one end of the closure and an opposite end of the closure, and wherein the reinforcement member, the upper member and the lower member are coupled to one another at coupling areas between the left and right connection portions.

15. The spoiler of claim 14, wherein the coupling areas include a first coupling area where the lower member is coupled directly to the reinforcement body of the reinforcement member, and a second coupling area where the upper member is coupled to the lower member with the reinforcement body interposed between the upper member and the lower member.

16. The spoiler of claim 3, wherein the reinforcement member includes left and right connection portions extending from the reinforcement body to the closure, the left and right connection portions being coupled to one end of the closure and an opposite end of the closure, and wherein the reinforcement member, the upper member and the lower member are coupled to one another at coupling areas between the left and right connection portions.

17. The spoiler of claim 16, wherein the coupling areas include a first coupling area where the lower member is coupled directly to the reinforcement body of the reinforcement member, and a second coupling area where the upper member is coupled to the lower member with the reinforcement body interposed between the upper member and the lower member.

18. The spoiler of claim 4, wherein the reinforcement member includes left and right connection portions extending from the reinforcement body to the closure, the left and right connection portions being coupled to one end of the closure and an opposite end of the closure, and wherein the reinforcement member, the upper member and the lower member are coupled to one another at coupling areas between the left and right connection portions.

19. The spoiler of claim 18, wherein the coupling areas include a first coupling area where the lower member is coupled directly to the reinforcement body of the reinforcement member, and a second coupling area where the upper member is coupled to the lower member with the reinforcement body interposed between the upper member and the lower member.

20. The spoiler of claim 2, wherein the reinforcement member and the lower member define a positioning area where the lower member is positioned with respect to the reinforcement member.

* * * * *